United States Patent [19]
Fujita

[11] Patent Number: 6,144,785
[45] Date of Patent: Nov. 7, 2000

[54] LIGHT SOURCE WITH WDM FUNCTION, AND OPTICAL AMPLIFIER AND TWO-WAY OPTICAL TRANSMISSION APPARATUS APPLIED THEREWITH

[75] Inventor: Masayuki Fujita, Tokyo, Japan

[73] Assignee: NEC Corporation, Tokyo, Japan

[21] Appl. No.: 09/265,554

[22] Filed: Mar. 9, 1999

[30] Foreign Application Priority Data

Mar. 10, 1998 [JP] Japan .................................. 10-057977

[51] Int. Cl.[7] ...................................................... G02B 6/28
[52] U.S. Cl. ................................ 385/24; 385/15; 385/16; 359/179; 359/333; 372/71
[58] Field of Search .................................. 385/15, 17, 24, 385/16, 37, 39, 122; 372/6, 21, 22, 71, 102; 359/177, 179, 333, 160, 341, 174, 127, 130, 194, 634

[56] References Cited

U.S. PATENT DOCUMENTS 6,061,481 5/2000 Heidrich et al. ...................... 385/16 X Primary Examiner—Phan T. H. Palmer
Attorney, Agent, or Firm—McGinn & Gibb, P.C.

[57] ABSTRACT

There are provided a light source outputting a light having a first wavelength; a terminal unit including a directional coupling section having first and second optical waveguides, in which a first surface is formed on one end of the directional coupling section, and first and second optical input/output units respectively connected to the first and second optical waveguides are connected to the other end of the directional coupling section, and the light having the first wavelength is input from one end, and the light having the second wavelength is input and output from the first optical input/output unit; and an optical filter provided between a first end surface and the light source for passing the light having the first wavelength and for reflecting the light having the second wavelength. The light having the first wavelength is output from the second optical input/output unit, and the light having the second wavelength is input or output. The directional coupling section is designed to have the complete coupling length for the light having the first wavelength, and have a half length of the complete coupling length for the light having the second wavelength. An optical amplifier reduces the loss generated in the process from the pump light source to the rare-earth doped optical fiber so that the reduction of the gain of the rare-earth doped optical fiber can be prevented.

16 Claims, 6 Drawing Sheets

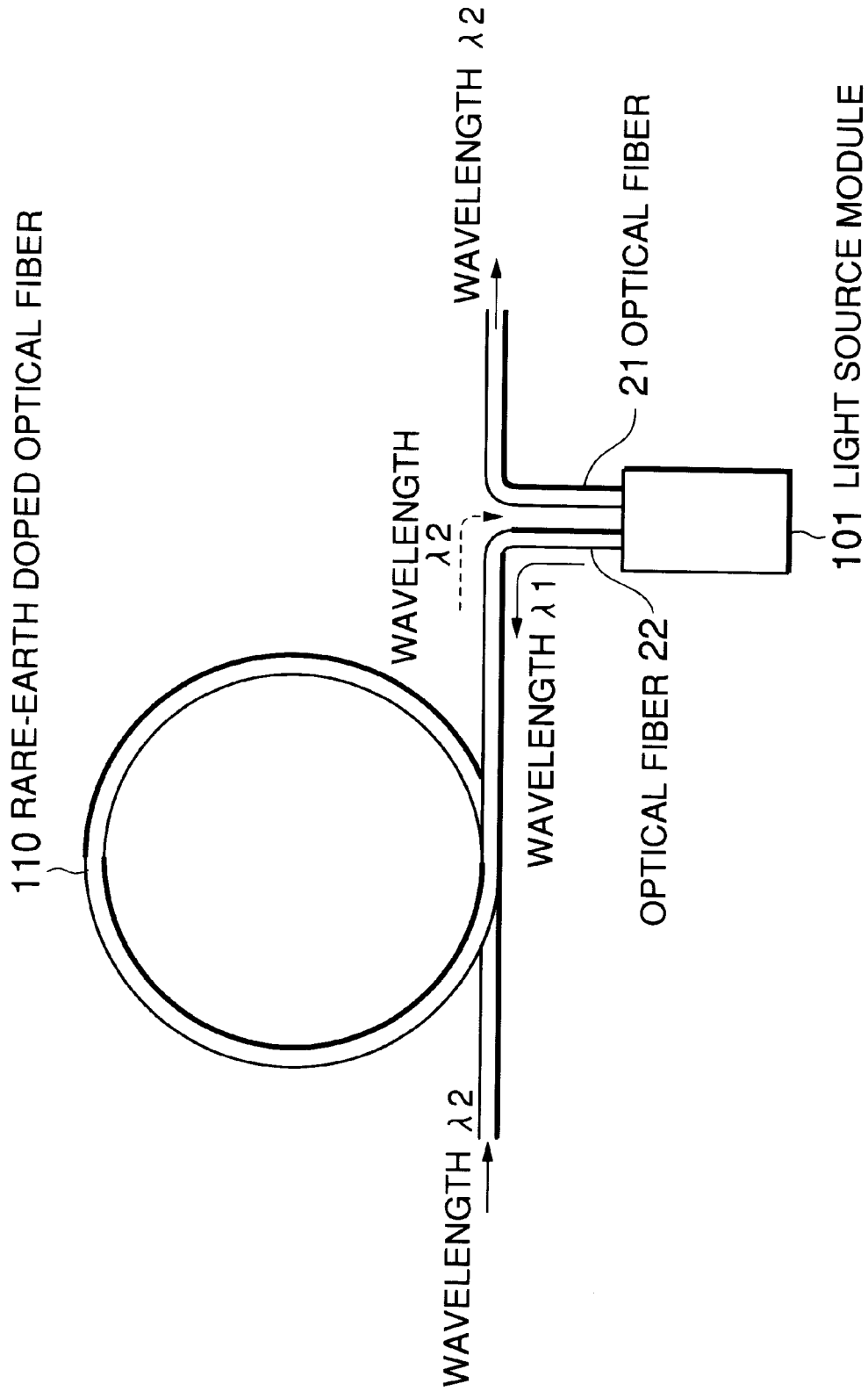

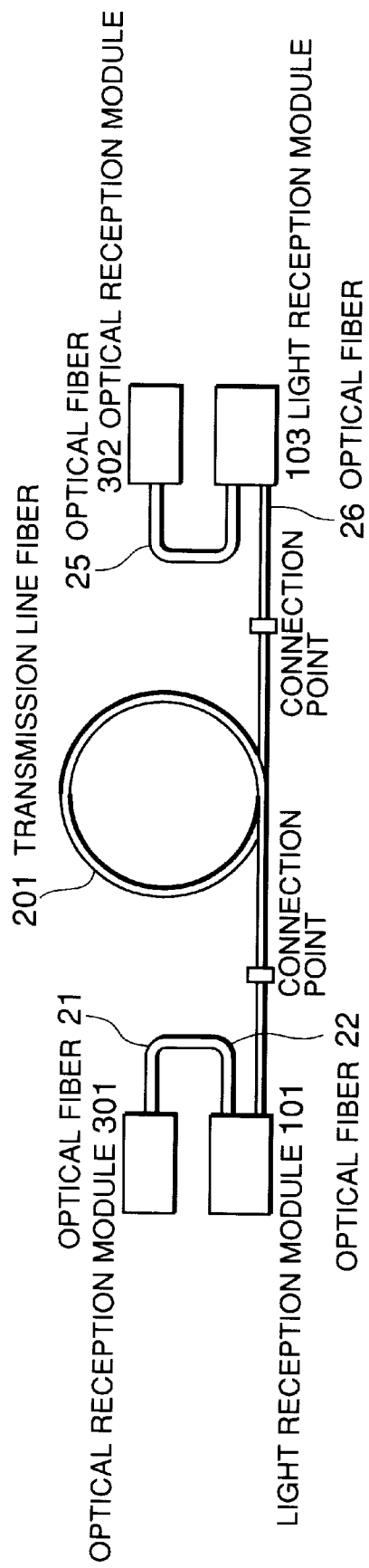

LIGHT SOURCE WITH WDM FUNCTION, AND OPTICAL AMPLIFIER AND TWO-WAY OPTICAL TRANSMISSION APPARATUS APPLIED THEREWITH

BACKGROUND OF THE INVENTION

1. Field of the Invention

The light source with a WDM function according to the present invention relates to a light source device having the function of wavelength-multiplexing a plurality of lights. The light source device according to the present invention is applicable to an optical communications device and an optical information processing device, and furthermore to an optical fiber amplifier and a two-way optical transmission apparatus can be applied to an optical communication field.

2. Description of the Related Art

An optical repeater for amplifying a signal light attenuated in a transmission line fiber is used in a long-distance optical fiber communications system. As an optical repeater, an optical fiber amplifier for directly amplifying the signal light using a rare-earth doped optical fiber as a gain media is well known.

In the optical fiber amplifier, it is necessary to lead with a signal light a pump light to a rare-earth doped optical fiber for use in an optical amplifying operation by exciting a rare-earth doped optical fiber. To attain this, the optical fiber amplifier should be designed to include a wavelength division multiplexer (WDM coupler) for division-multiplexing the signal light and the pump light.

That is, the conventional optical fiber amplifier includes a pump light source for outputting a pump light; a WDM coupler for division-multiplexing a pump light and a signal light and leading the resultant light to a rare-earth doped optical fiber; and a rare-earth doped optical fiber, that is, a gain media. For example, an optical fiber fused coupler and an optical filter made of a dielectric multi-layered film can be used as a WDM coupler.

In the conventional optical fiber amplifier, the optical coupler for coupling a pump light source with an optical fiber and a WDM coupler are arranged after being inserted into the optical path from the pump light source to a rare-earth doped optical fiber. Therefore, the output of the pump light source is attenuated by the optical coupler and the WDM coupler. As a result, the pump light power input to the rare-earth doped optical fiber is reduced. This causes such a disadvantage that the gain of the signal light in the rare-earth doped optical fiber is undesirably reduced.

SUMMARY OF THE INVENTION

The light source with WDM function and the optical amplifier according to the present invention aims for reducing the loss generated in the process from the pump light source to the rare-earth doped optical fiber so that the reduction of the gain of the rare-earth doped optical fiber can be prevented. Another object of the present invention is to minimize the whole size of the optical amplifier.

The light source device according to the present invention includes a light source for outputting a light having the first wavelength; a terminal unit; a first optical fiber; an optical filter; and a second optical fiber. The terminal unit includes a directional coupling section having the first and second optical waveguides. The first surface is formed on one end of the directional coupling section, and the first and second optical input/output units respectively connected to the first and second optical waveguides are connected to the other end of the directional coupling section. The light having the first wavelength is input to the first optical waveguide. The first optical fiber couples the light having the second wavelength to the first optical input/output unit. The optical filter is provided between the first surface and the light source, and passes the light having the first wavelength, and reflects the light having the second wavelength. The second optical fiber outputs the light having the first wavelength from the second optical input/output unit, and inputs or outputs the light having the second wavelength.

The above described directional coupling section is designed to have a complete coupling length for the light having the first wavelength. Simultaneously, the directional coupling section has a half length of the complete coupling length for the light having the second wavelength.

The light source device according to the present invention has a semiconductor laser as a light source. The directional coupling section is formed by fusing two optical waveguides, or by a quartz optical waveguide. The first and second wavelengths are respectively 1480 nm band and 1550 nm band, 980 nm band and 1550 nm band, or 1016 nm band and 1300 nm band.

The optical amplifier according to the present invention includes the light source device and the rare-earth doped optical fiber, and the rare-earth doped optical fiber is directly connected to either the second optical fiber of the light source device or the second optical input/output unit.

The light source device according to the present invention is a light source with a WDM function, and includes the first light source device for wavelength-multiplexing the light having the first wavelength $\lambda 1$ with the light having the second wavelength $\lambda 2$, and outputting the wavelength-multiplexed light from the second optical fiber. The first optical fiber is connected to the second optical fiber in the first light source device, and the light having the third wavelength $\lambda 3$ is further wavelength-multiplexed with the above described wavelength-multiplexed light and then output. The light source device further includes the second light source device for receiving the wavelength-multiplexed light containing the wavelengths $\lambda 1$ and $\lambda 2$. It has a wavelength-multiplexing function for outputting a wavelength-multiplexed light obtained by wavelength-multiplex the light having the third wavelength $\lambda 3$ with the wavelength-multiplexed light containing the wavelengths $\lambda 1$ and $\lambda 2$ from the second optical fiber of the second light source device.

Furthermore, the two-way optical transmission apparatus according to the present invention is a light source with a WDM function, and includes the first light source device containing the light having the first wavelength $\lambda 1$ and receives the light having the second wavelength $\lambda 2$ through the second optical fiber. The two-way optical transmission apparatus further includes a first optical transmission/reception device containing the first receiving optics, connected to the second optical fiber of the first light source device, for receiving the light having the wavelength $\lambda 2$, and converting it into an electric signal. In addition, the two-way optical transmission apparatus according to the present invention includes a second light source device containing the light having the first wavelength $\lambda 1$, and receiving the light having the wavelength $\lambda 1$ through the second optical fiber. It further includes the second optical transmission/reception device containing the second receiving optics, connected to the second optical fiber of the second light source device, for receiving the light having the wavelength $\lambda 1$, and converting it into an electric signal. The first and second optical transmission/reception devices are connected through a transmission line fiber.

BRIEF DESCRIPTION OF THE DRAWINGS

The above-mentioned and other objects, features and advantages of this invention will become more apparent by reference to the following detailed description of the invention taken in conjunction with the accompanying drawings wherein:

FIG. 5 shows the configuration according to the second embodiment of the optical fiber amplifier of the present invention; and FIG. 6 shows the configuration according to an embodiment of the two-way optical transmission device of the present invention.

DETAILED DESCRIPTION OF THE PREFERRED EMBODIMENTS

Next, the configurations of the light source with a WDM function, and the optical amplifier and the two-way optical transmission apparatus applied therewith according to the present invention are described below in detail by referring to the attached drawings.

Figure 1:
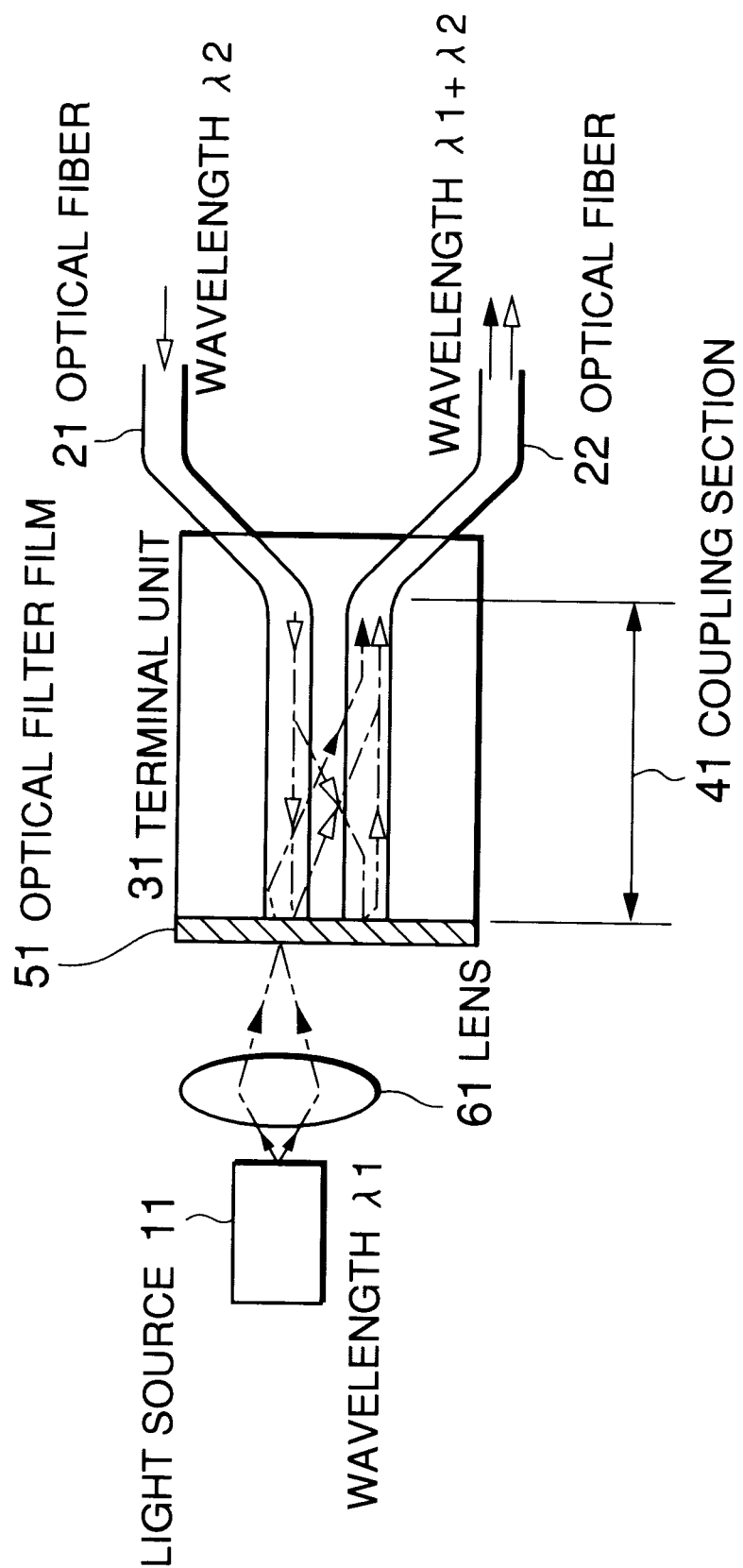
FIG. 1 shows the configuration according to the first embodiment of the light source with a WDM function according to the present invention.

FIG. 1 shows the configuration according to the first embodiment of the light source with a WDM function according to the present invention.

The light having the first wavelength $\lambda 1$ output from a light source 11 is collected by a lens 61 and coupled to the first optical waveguide. According to the present embodiment, a semiconductor laser is used as a light source. In this embodiment, the lens 61 is used in coupling the light, but the light can be directly coupled by providing the semiconductor laser adjacently to the end of the optical waveguide.

A terminal unit 31 comprises a quartz optical waveguide substructure which is a quartz optical waveguide and on which a directional coupling section 41 is formed in a patterning process, or a fused-type coupler on which the directional coupling section 41 is formed by fusing two optical fibers. In the terminal unit 31, the coupling section 41 has two optical waveguides having predetermined lengths adjacently provided to each other.

Lights are coupled through an evanescent wave between two optical waveguides (or optical fibers) adjacently provided in the coupling section 41, and optical power is gradually transferred from one optical waveguide to the other optical waveguide. The transfer distance of the optical power from the one optical waveguide to the other optical waveguide, that is, the complete coupling length, is determined by the distance between an optical wavelength and an optical waveguide. Therefore, by selecting the distance between two optical waveguides in a coupling section, the coupling distance t from the first optical waveguide to the second optical waveguide can be set to the complete coupling length L1 of the light having the first wavelength $\lambda 1$, and to a half length of the complete coupling length L2 of the light having the second wavelength $\lambda 2$.

On the side of the light source 11 of the terminal unit 31, a surface is formed and an optical filter for passing the light having the first wavelength $\lambda 1$, and reflecting the light having the second wavelength $\lambda 2$ described later is provided. According to the present embodiment, a ground surface is directly coated with an optical filter film 51 by an evaporation coating, etc. The above described configuration can be replaced with a filter plate attached to the surface.

The light having the first wavelength $\lambda 1$ output from the light source 11 passes through the optical filter film 51, and is then input to the first optical waveguide. The input guide light is gradually transferred in the coupling section 41 from the first optical waveguide to the second optical waveguide through the above described evanescent coupling. The light is completely transferred to the other second optical waveguide at the end of the complete coupling length, that is, at the end of the coupling section 41. The transferred light is directly output to an external unit through the second optical input/output unit. In the present embodiment, it is output from an optical fiber 22.

On the other hand, the light having the second wavelength $\lambda 2$ input from the first optical input/output unit, that is, an optical fiber 21 according to the present embodiment, is input to the coupling section 41. Since the coupling section 41 has a half length of the complete coupling length, the light having the second wavelength $\lambda 2$ stops the transfer halfway to the second optical waveguide at the point where it reaches the optical filter film 51. Then, the light is reflected by the optical filter film 51. The reflected light is transferred for the second half in the coupling section 41, thereby guided by the complete coupling length at the end position in the coupling section 41. In this process, the light is completely transferred to the second optical waveguide. In the present embodiment, the transferred light is externally output from the second optical fiber 22. The similar function can be obtained for the light having the second wavelength $\lambda 2$ with the second optical fiber 22 set as an input side and the first optical fiber 21 set as an output side.

When an optical fiber fused coupler is used as the terminal unit 31, a fused extension unit can be produced by cutting and grinding. First, in the same method as in the optical fiber fused type WDM coupler, two optical fibers are coupled, heated, and fused to produce a coupling section by extending the fused portion. Then, the coupling section is cut, and the cut surface is ground to adjust the coupling section into a desired length. A dielectric multi-layered film optical filter can be applied to the cut surface of the terminal unit 31. The above described configuration can be replaced with the cut surface directly coated with a dielectric multi-layered film.

In the terminal unit 31, a dielectric coupling section can be formed by closely arranging two quartz waveguides on a silicon substructure. In this case, a semiconductor laser can be arranged as the light source 11 near the surface of the optical waveguide to couple an output light directly to the optical waveguide, or to couple the output light using an optical collecting unit such as a lens, etc.

Described below is a second embodiment intended for enhancing the performance of the first embodiment.

According to the first embodiment of the light source with a WDM function of the present invention shown in FIG. 1, an oscillating operation of the light source 11 can become unstable when a light output from the light source 11 is reflected by the optical filter film 51, the terminal unit 31, or the portion around the farther end of the optical fibers 21 and 22, and then is input to the light source.

Figure 2:
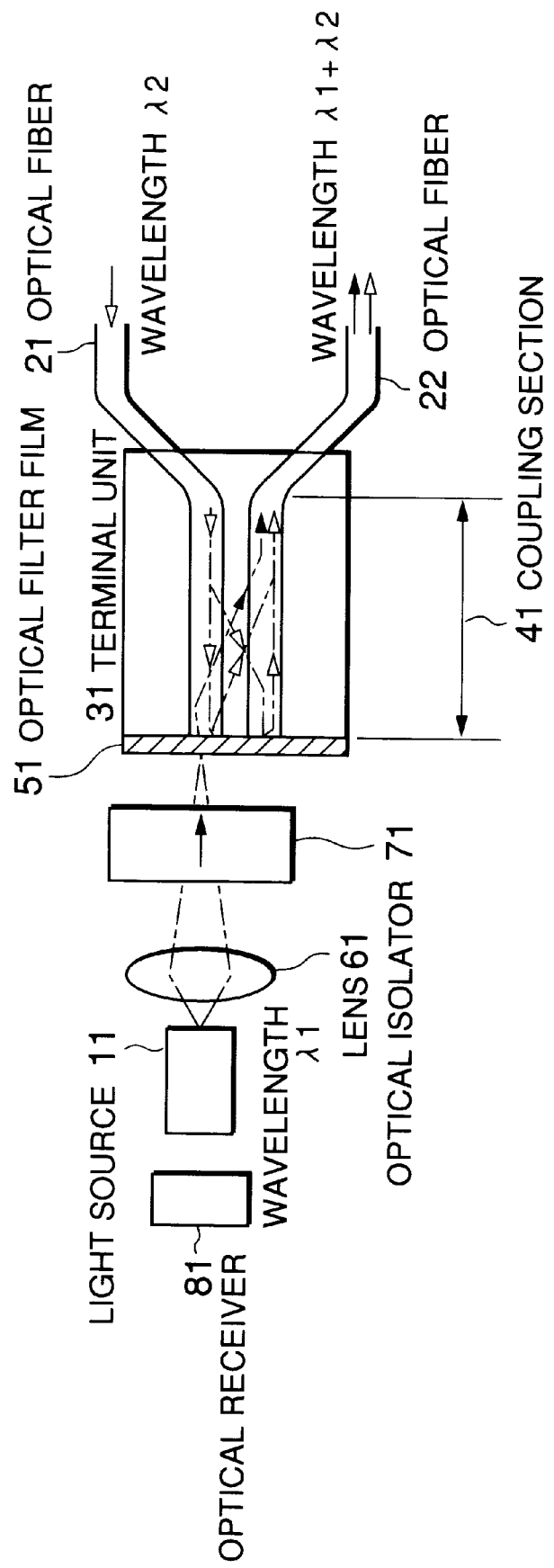
FIG. 2 shows the configuration according to the second embodiment of the light source with a WDM function according to the present invention.

According to the configuration shown in FIG. 2, an optical isolator 71 is arranged between the lens 61 for collecting output lights from the light source 11 and the terminal unit 31 to prevent an unstable operation of the light source 11 caused by reflection.

On the other hand, a receiver 81 is provided at a position facing the lens 61 with the light source 11 placed between the receiver 81 and the lens 61, and monitors an output light from the light source 11. The optical filter film 51 reflects the light having the wavelength $\lambda 2$ to stop it from being passed to the light source 11. However, it is difficult to obtain the reflectance of 100% to completely cut the light. Therefore, a part of the light having the wavelength $\lambda 2$ input from the optical fiber 21 passes through the optical filter film 51, passes through the lens 61 and the light source 11, and is input to the receiver 81. In this case, there arises an error in an output light monitor level. However, by providing the optical isolator 71 according to the present embodiment, an excess light is prevented from being input to the light source 11 and the receiver 81, thereby guaranteeing a stable operation of the light source 11 and monitoring an output light with high precision. A photo diode, etc. can be used as the receiver 81, and a Faraday rotor, etc. can be used as an optical isolator.

Described below is an embodiment realized when the wavelength-multiplexing function of the light source device according to the present invention is furthermore extended.

Figure 3:
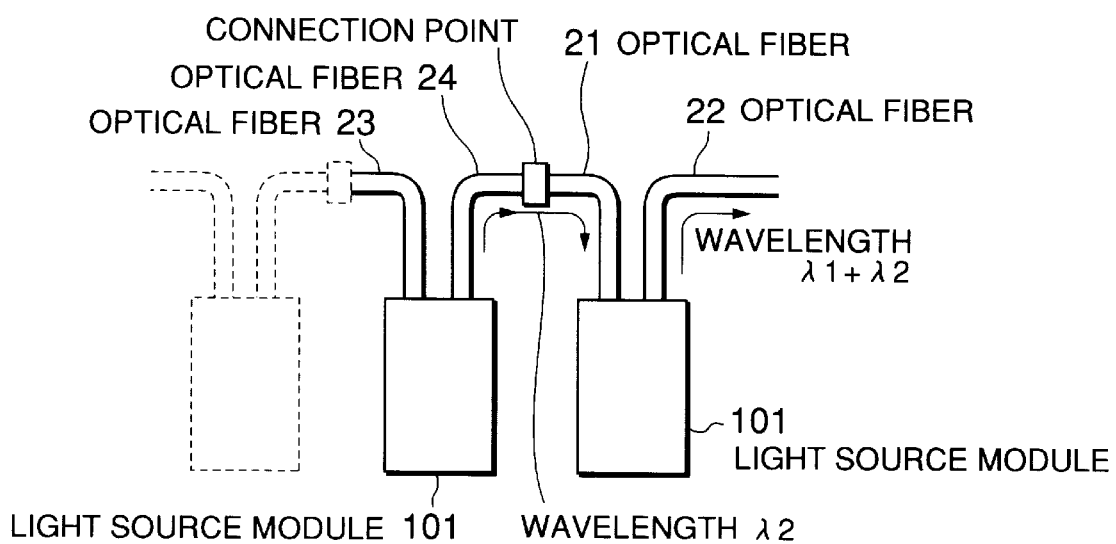
FIG. 3 shows the configuration according to the third embodiment of the light source with a WDM function according to the present invention.

FIG. 3 shows the configuration according to the third embodiment of the optical source device of the present invention. The light source device shown in FIG. 3 has the configuration in which a number of stages of light source devices shown in FIG. 1 or 2 are serially connected. That is, an optical fiber 24 on the output side of a second light source device 102 is connected to the optical fiber 21 on the input side of a first light source device 101.

The light having the wavelength $\lambda 2$ output from the first optical fiber 23 of the second light source device 102 is input to a first light source device 101 through the optical fiber 22. A light obtained by wavelength-multiplexing the light having the wavelength $\lambda 1$ and the light having the wavelength $\lambda 2$ is output from the optical fiber 21 of the first light source device 101. Thus, a wavelength-multiplexed light source can be realized using the light source device according to the present invention.

Similarly, the number of wavelength-multiplexing stages of light sources can be sequentially increased by serially connecting a plurality of stages of light sources devices of the present invention. That is, the number of wavelength-multiplexing stages of lights output from the first optical fiber of the first-stage light source device can be increased by sequentially connecting the first optical fiber of the second light source device to the second optical fiber of the (n-1)th light source module.

The above described wavelength-multiplexed light source according to the light source device according to the present invention has the feature that the light source can be sequentially added during the operation. That is, since the first-stage light source device connected to a transmission line fiber can be followed by successively connected light source devices, a new light source device can be additionally connected to the last stage light source device during the operation of the light source devices already connected to the transmission line fiber without stopping the operation of the light source devices.

Described below is an embodiment of the optical fiber amplifier comprising the light source device according to the present invention.

Figure 4:
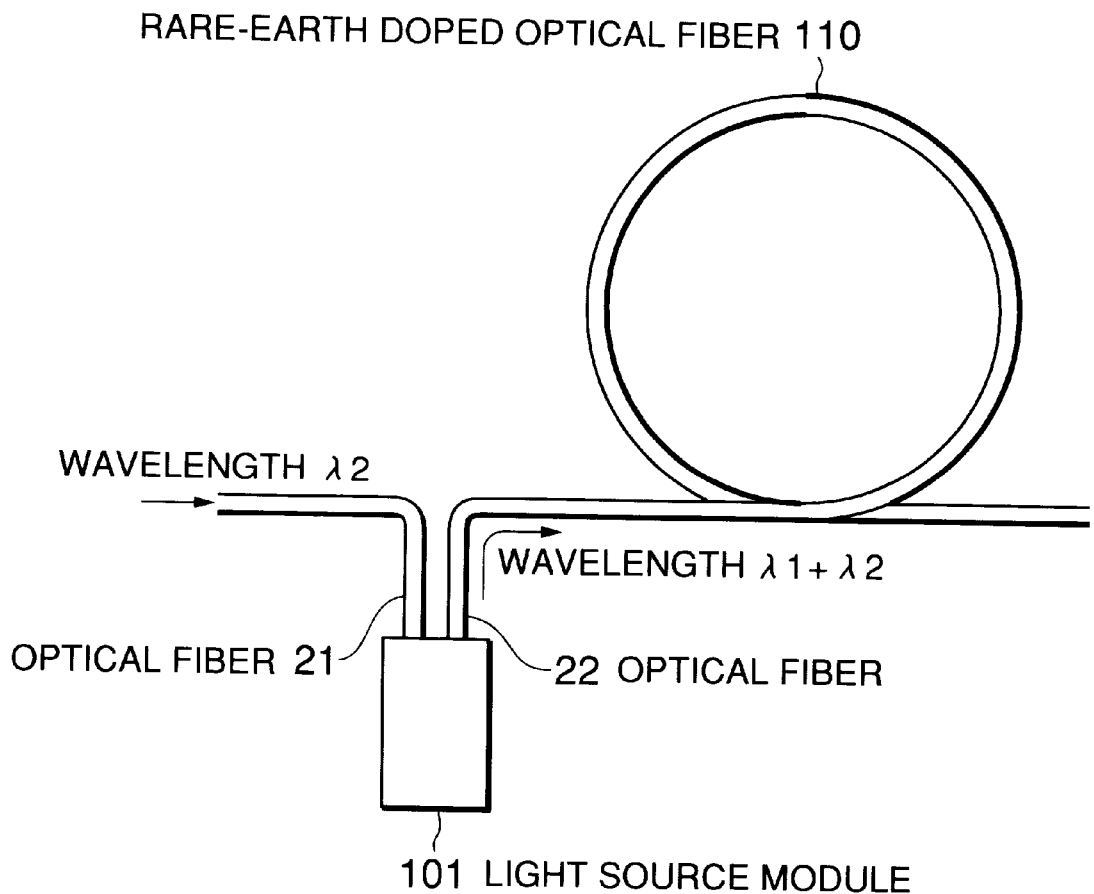
FIG. 4 shows the configuration according to the first embodiment of the optical fiber amplifier of the present invention.

FIGS. 4 and 5 show the configuration according to an embodiment of the optical fiber amplifier comprising the light source device of the present invention. FIG. 4 shows the configuration of the optical fiber amplifier with a forward pumping source provided at the stage before a rare-earth doped optical fiber 110 which is an amplifying optical fiber. FIG. 5 shows the configuration of the optical fiber amplifier with a backward pumping source provided at the stage after the optical fiber.

For example, the optical fiber amplifier comprising the light source device according to the present invention is described below by referring to FIG. 4. One end of the rare-earth doped optical fiber 110, which is exited by the light having the wavelength $\lambda 1$ and amplifies an input signal light having the wavelength $\lambda 2$, is connected to the optical fiber 21. In this example, the light source 11 in the light source device 101 functions as a pump light source for exciting the rare-earth ion of the rare-earth doped optical fiber 110.

A typical rare-earth doped optical fiber 110 is an erbium (Er) doped optical fiber. In this case, a semiconductor laser for outputting a light of 1480 nm band can be used as the light source 11 in the light source device 101. Therefore, in this case, the wavelength $\lambda 1$ in the above explanation belongs to the 1480 nm band.

When an erbium doped optical fiber is used, the wavelength $\lambda 2$ of the signal light input from the optical fiber 22 belongs to 1550 nm band, that is, the amplifying wavelength band of the erbium doped optical fiber. The light of 1550 nm band ($\lambda 2$) input from the optical fiber 22 is wavelength-multiplexed in the light source device 101 with the light of 1480 nm band ($\lambda 1$) output from the light source 11 in the light source device 101. These lights are output from the optical fiber 21 and input to the rare-earth doped optical fiber 110. The Er of the rare-earth doped optical fiber 110 is excited by the light of 1480 nm band, and the light of 1550 nm band is amplified, and is output from the further end of the rare-earth doped optical fiber 110.

According to the present embodiment, the WDM coupler which has been required in the conventional optical fiber amplifier between the light source device and the rare-earth doped optical fiber is not necessary. Therefore, the output light from a pump light source can be efficiently led to the rare-earth doped optical fiber to maintain a high amplification gain of the rare-earth doped optical fiber. That is, the problem with the conventional technology that the WDM coupler is inserted and reduces the gain of the rare-earth doped optical fiber can be avoided. Since the WDM coupler is not required, the entire optical system can be very small.

According to the above described embodiment, the wavelength of the pump light source when the erbium doped optical fiber is used is 1480 nm. However, it is obvious that a pump light having the wavelength of 980 nm can also be used.

The configuration shown in FIG. 5 refers to an optical fiber amplifier with a backward pumping source. It is different from the one with a forward pumping source shown in FIG. 4 in that the light having the wavelength $\lambda 2$ is input from the optical fiber 21 to the light source device 101 through the rare-earth doped optical fiber 110. The light having the wavelength $\lambda 2$ amplified by the rare-earth doped optical fiber 110 is input from the optical fiber 21 to the light source device 101, and then output from the optical fiber 22.

In each of the above described embodiments, the optical fiber amplifier can be used to amplify lights having different wavelength bands. For example, a praseodymium (Pr) doped optical fiber can be used as the rare-earth doped optical fiber 110 with the wavelengths λ1 and λ2 respectively set to 1016 nm band and 1300 nm band.

Normally, a praseodymium doped optical fiber is formed using fluoride as host glass. Therefore, it is difficult to fuse and connect the quartz normally used as a host glass for a transmission line fiber to the praseodymium doped optical fiber. Therefore, the transmission line fiber can be connected to the praseodymium doped optical fiber by mechanically connecting the optical fibers using a connector, etc., or by coupling them through a lens. As a result, the problems that a connection loss arises, the entire size cannot be reduced, etc. newly occur.

On the other hand, according to the present invention, the praseodymium doped optical fiber can be used as the optical fiber 21 of the light source device, thereby eliminating the above described problems.

A two-way optical transmission apparatus can also be designed using the light source device according to the present invention. FIG. 6 shows the configuration according to an embodiment of the two-way optical transmission apparatus of the present invention.

As shown in FIG. 6, the light source device 101 and a light source device 103 are connected to each other through a transmission line fiber 201. Optical reception devices 301 and 302 are connected to the respective light source devices.

The first and second wavelengths of the light source device 101 are λ1 and λ2 respectively. The first and second wavelengths of the light source device 103 are λ2 and λ1 respectively. The light having the wavelength λ1 output from the first optical fiber 21 of the light source device 101 is input to a first optical fiber 25 of the light source device 103 through the transmission line fiber 201, output from a second optical fiber 26 of the light source device 103, and then input to and received by the optical reception device 302.

On the other hand, the light having the wavelength λ2 output from the first optical fiber 25 of the light source device 103 is input to the first optical fiber 21 of the light source device 101 through the transmission line fiber 201, output from the second optical fiber 22 of the light source module 101, and then received by the optical reception device 301. In the present embodiment, for example, wavelengths λ1 and λ2 can be respectively assigned the lights of 1300 nm and 1550 nm for two-way wavelength-multiplexed light transmission. The receiving optics such as photo diode, avalanche diode, etc. can be applied to the optical reception devices 301 and 302.

The two-way optical transmission apparatus using the light source device according to the present invention as shown in FIG. 6 does not require a WDM coupler for demultiplexing a wavelength on the transmission/reception side. Therefore, a two-way optical transmission system without a large excessive loss can be realized. In addition, the entire system can be smaller on the transmission/reception side. The light source device described above by referring to the first through third embodiment can be used.

The light source with a WDM function according to the present invention has the function of outputting a light obtained by wavelength-multiplexing the light output from a light source element with the light input from an external device. Therefore, a small and high gain optical fiber amplifier can be realized by connecting a rare-earth doped optical fiber to the light source device according to the present invention.

A wavelength-multiplexed light source can be designed by serially connecting plural stages of light source devices. A wavelength-multiplexed optical fiber amplifier can also be realized according to the present invention. At this time, light source devices of new wavelengths can be sequentially connected to the current last stage of the light source device. Therefore, they can be added without stopping the operations of the optical fiber amplifier, etc.

Furthermore, the two-way optical transmission apparatus can also be realized by connecting the light source device and the optical reception device according to the present invention to both ends of the transmission line fiber.

While this invention has been described in connection with certain preferred embodiments, it is to be understood that the subject matter encompassed by way of this invention is not to be limited to those specific embodiments. On the contrary, it is intended for the subject matter of the invention to include all alternative, modification, and equivalents as can be included within the spirit and scope of the following claims.

What is claimed is:

1. A light source with a WDM function, comprising:

light source for outputting a light having a first wavelength;

first optical input means for inputting the light having the first wavelength to a first optical waveguide from a first surface;

second optical input means for inputting a light having a second wavelength to the first optical waveguide from a second surface on a reverse side of the first surface;

an optical filter, provided between said first surface and said light source, for passing the light having the first wavelength and reflecting the light having the second wavelength;

a second optical waveguide; and an optical output terminal, provided on a first surface side, for coupling a light to said second optical waveguide, wherein, a directional coupling section is formed by said first optical waveguide and said second optical waveguide, and said directional coupling section has a length equal to a complete coupling length for said light having the first wavelength, and has a half length of the complete coupling length for said light having the second wavelength.

2. The light source according to claim 1, wherein said light source is a semiconductor laser.

3. The light source according to claim 1, wherein said first optical input means contains a first optical fiber; and said second optical input means contains a second optical fiber.

4. The light source according to claim 1, wherein, said first optical waveguide and said second optical waveguide are optical fibers, and said directional coupling section is a fused-type optical fiber containing a part of said optical fiber.

5. The light source according to claim 1, wherein said first optical waveguide and said second optical waveguide contain quartz optical waveguides.

6. The light source according to claim 1, wherein said first wavelength is 1480 nm band, and said second wavelength is 1550 nm band.

7. The light source according to claim 1, wherein said first wavelength is 980 nm band, and said second wavelength is 1550 nm band.

8. The light source according to claim 1, wherein said first wavelength is 1016 nm band, and said second wavelength is 1300 nm band.

9. A light source with a WDM function, comprising:
a first light source device; and
a second light source device, wherein;
said first light source device comprises:
a first light source for outputting a light having a first wavelength;
first optical input means for inputting the light having the first wavelength to a first optical waveguide from a first surface;
second optical input means for inputting a light having a second wavelength to the first optical waveguide from a second surface on a reverse side of the first surface;
a first optical filter, provided between said first surface and said first light source, for passing the light having the first wavelength and reflecting the light having the second wavelength;
a second optical waveguide; and
a first optical output terminal, provided on the second surface side, for coupling a light to said second optical waveguide, wherein;
a first directional coupling section is formed by a first optical waveguide and said second optical waveguide, and said first directional coupling section has a length equal to a complete coupling length for said light having the first wavelength, and has a half length of the complete coupling length for said light having the second wavelength; and
said second light source device comprises:
a second light source for outputting a light having a third wavelength;
third optical input means for inputting the light having the third wavelength to a third optical waveguide from a third surface;
fourth optical input means, connected to said first optical output terminal, for inputting a light having the wavelength-multiplexed light to the third optical waveguide from a fourth surface on a reverse side of the third surface;
a second optical filter, provided between said third surface and said second light source, for passing the light having the third wavelength and reflecting a light input from said fourth optical input means;
a fourth optical waveguide; and
a second optical output terminal, provided on the fourth surface side, for coupling a light to said fourth optical waveguide, wherein
a second directional coupling section is formed by a third optical waveguide and a fourth optical waveguide;
said second directional coupling section has a complete coupling length for said light having the third wavelength, and has a half length of the complete coupling length for the wavelength-multiplexed light.

10. The light source according to claim 9, wherein said first wavelength is 980 nm band, and said second wavelength is 1550 nm band.

11. The light source according to claim 9, wherein said first wavelength is 1016 nm band, and said second wavelength is 1300 nm band.

12. The light source according to claim 9, wherein said first wavelength is 1480 nm band, and said second wavelength is 1550 nm band.

13. An optical amplifier, comprising:
a light source with a WDM function and a rare-earth doped optical fiber connected to said light source with a WDM function, wherein
light source with a WDM function comprises:
a light source for outputting a light having a first wavelength;
first optical input means for inputting the light having the first wavelength to a first optical waveguide from a first surface;
second optical input means for inputting a light having a second wavelength to the first optical waveguide from a second surface on a reverse side of the first surface;
an optical filter, provided between said first surface and said light source, for passing the light having the first wavelength and reflecting the light having the second wavelength;
a second optical waveguide; and
an optical output terminal, provided on a first surface side, for coupling a light to said second optical waveguide, wherein:
a directional coupling section is formed by a first optical waveguide and said second optical waveguide;
said directional coupling section has a complete coupling length for said light having the first wavelength, and has a half length of the complete coupling length for said light having the second wavelength; and
said rare-earth doped optical fiber is connected to the optical output terminal.

14. The optical amplifier according to claim 13, wherein said rare-earth doped optical fiber contains a praseodymium doped optical fiber.

15. The optical amplifier according to claim 13, wherein said rare-earth doped optical fiber contains an erbium doped optical fiber.

16. A two-way optical transmission apparatus having a first light source module with a WDM function, a second light source with a WDM function, and a transmission line optical fiber for connecting the first light source module with a WDM function and the second light source with a WDM function, wherein;
said first light source with a WDM function comprises:
a first light source for outputting a light having a first wavelength;
first optical input means for inputting the light having the first wavelength to a first optical waveguide from a first surface;
a first optical input/output terminal for inputting a light having a second wavelength to the second optical waveguide from a second surface on a reverse side of the first surface, and outputting the light having the first wavelength; and
a first optical filter, provided between said first surface and said first light source, for passing the light having the first wavelength and reflecting the light having the second wavelength, wherein
a first directional coupling section is formed by a first optical waveguide and said second optical waveguide;
said first directional coupling section has a complete coupling length for said light having the first wavelength, and has a half length of the complete coupling length for said light having the second wavelength;

said second light source with a WDM function comprises:
- a second light source for outputting a light having a second wavelength;
- second optical input means for inputting the light having the second wavelength to a third optical waveguide from a third surface;
- a second optical input/output terminal for inputting a light having a first wavelength to a fourth optical waveguide from a fourth surface on a reverse side of the third surface, and outputting the light having the second wavelength; and
- a second optical filter, provided between said third surface and said second light source, for passing the light having the second wavelength and reflecting the light having the first wavelength, wherein
- a second directional coupling section is formed by a third optical waveguide and a fourth optical waveguide;
- said second directional coupling section has almost a complete coupling length for said light having the second wavelength, and has almost a half length of the complete coupling length for said light having the first wavelength; and said two-way optical transmission apparatus further comprises:
- a first optical receiver for receiving the light having the second wavelength output from said first optical waveguide; and
- a second optical receiver for receiving the light having the first wavelength output from said third optical waveguide.

* * * * *